UNITED STATES PATENT OFFICE.

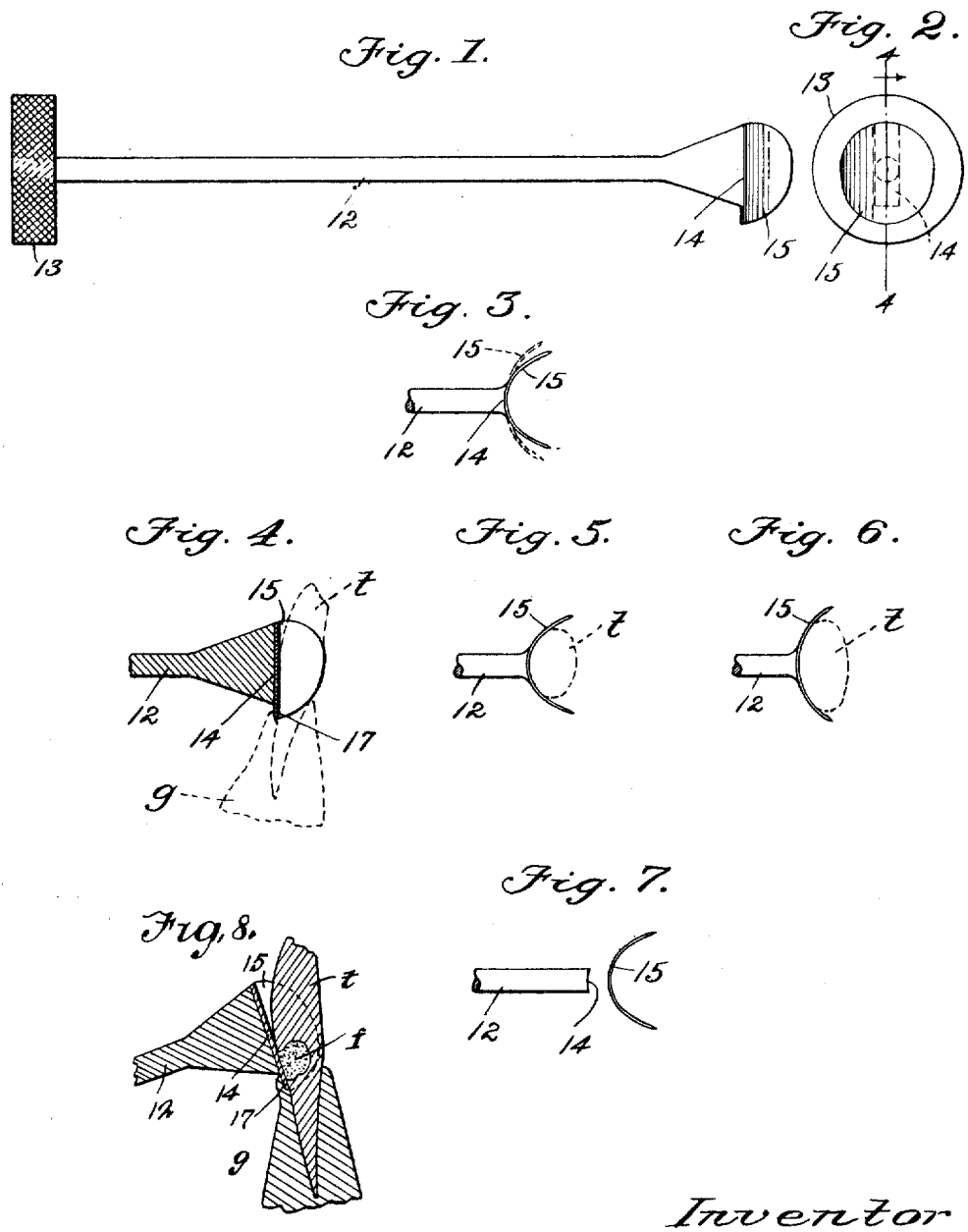

WILLIAM O'HALLORAN, OF STOUGHTON, MASSACHUSETTS.

TOOL FOR FORMING CERVICAL FILLINGS.

1,310,014.	Specification of Letters Patent.	Patented July 15, 1919.

Application filed September 20, 1918. Serial No. 254,932.

*To all whom it may concern:*

Be it known that I, WILLIAM O'HALLORAN, a citizen of the United States, residing at Stoughton, in the county of Norfolk and State of Massachusetts, have invented new and useful Improvements in Tools for Forming Cervical Fillings, of which the following is a specification.

This invention relates to dental tools for tamping and externally shaping plastic fillings inserted in cavities formed in the labial surfaces of teeth, and is embodied in the improvements which I shall now proceed to describe and claim.

Of the accompanying drawings, forming a part of this specification:

Figure 1 is a side view of a tool embodying the invention.

Fig. 2 is an end view.

Fig. 3 is a top or edge view.

Fig. 4 is a section on line 4—4 of Fig. 2.

Figs. 5 and 6 are views similar to Fig. 3, showing different curvatures of the flexible head of the tool.

Fig. 7 is a view similar to Fig. 3, showing the shank and head separated.

Fig. 8 is a view similar to Fig. 4, showing the tooth in section.

The tool is shown enlarged about three times.

The same reference characters indicate the same parts in all of the figures.

In the drawings, 12 represents a shank, which may be a slender rod of steel or other metal, and may have a handle 13 at one end. The opposite end of the shank is blunt, and formed to constitute an oblong seat 14 for the head hereinafter described. To the seat 14 is brazed or soldered a thin head 15 of any suitable ductile metal, such as gold, or platinoid otherwise known as German silver, said head being preferably of about the thickness of ordinary writing paper and adapted to be easily bent by the fingers and to retain any form imparted by bending pressure. The margin of the head is preferably formed as shown by Fig. 2. That portion of the head surrounded by the dotted line (Fig. 3) indicating the seat 14 constitutes a rigid central portion. The portions of the head at opposite sides of the central portion constitute flexible wings adapted to be bent.

The head 15 is curved to impart a reëntrant form to its outer side, said side constituting a tamping or matrix face, which is curved to conform to the transverse curvature of the labial face of a tooth *t*.

The tool is used to exert pressure on the portion of a plastic filling which protrudes from the face of the tooth surrounding a filling-receiving cavity, the curved tamping face being pressed against said protruding portion, and not only compacting the filling *f* in the cavity, but also molding the external surface of the filling, and causing said surface to conform to the surrounding surface of the tooth as indicated by Fig. 8. As may be seen by comparing Fig. 5 with Fig. 6, the head is adaptable to teeth having labial faces of different curvatures.

One edge of the central portion of the head is extended from the shank to form a flange 17 adapted to be interposed between the tooth *t* and the outer portion of the gum *g*. The edge of the shank from which said flange projects provides a guard or stop bearing on the edge of the gum and limiting the entrance of the sharp edge of the head between the gum and face, thus preventing injury to the gum and discomfort to the patient.

The described tool is adapted especially for externally forming a cervical filling, or a filling inserted in a cavity at or near the cervical margin of a tooth.

I claim:

1. A dental tool comprising a shank and a tamping head of ductile metal, having a central portion seated on and rigidly backed by one end of the shank, and oppositely projecting flexible wings, said central portion and wings forming a curved face adapted to conform to the labial face of a tooth and to be bent to and retain different curvatures.

2. A dental tool according to claim 1, one edge of the central portion being extended to form a flange projecting from one of the edges of the shank and adapted to be interposed between a tooth face and a gum, said shank edge forming a guard limiting the entrance of the head between the gum and the tooth face.

In testimony whereof I have affixed my signature.

WILLIAM O'HALLORAN.

Copies of this patent may be obtained for five cents each, by addressing the "Commissioner of Patents, Washington, D. C."